US006334173B1

(12) United States Patent
Won et al.

(10) Patent No.: US 6,334,173 B1
(45) Date of Patent: Dec. 25, 2001

(54) COMBINED CACHE WITH MAIN MEMORY AND A CONTROL METHOD THEREOF

(75) Inventors: Na Ra Won; Wook Jin Cha; Sung Sik Lee; Sung Goo Park; Ji Ho Ryoo, all of Ichon-shi (KR)

(73) Assignee: Hyundai Electronics Industries Co. Ltd., Ichon (KR)

( * ) Notice: Subject to any disclaimer, the term of this patent is extended or adjusted under 35 U.S.C. 154(b) by 0 days.

(21) Appl. No.: 09/192,541

(22) Filed: Nov. 17, 1998

(30) Foreign Application Priority Data

| Nov. 17, 1997 | (KR) | ................................. | 97-60519 |
| Nov. 17, 1997 | (KR) | ................................. | 97-60520 |
| Nov. 18, 1997 | (KR) | ................................. | 97-32595 |
| Nov. 18, 1997 | (KR) | ................................. | 97-32596 |

(51) Int. Cl.[7] .................................................. G06F 12/00
(52) U.S. Cl. ........................... 711/156; 711/209; 711/219
(58) Field of Search ..................... 711/118, 128, 711/156, 154, 124, 209, 219, 144, 145

(56) References Cited

U.S. PATENT DOCUMENTS

| 4,858,111 | 8/1989 | Steps . |
| 4,899,275 | 2/1990 | Sachs et al. . |
| 4,985,829 | 1/1991 | Thatte et al. . |
| 5,136,691 | 8/1992 | Baror . |
| 5,488,709 | 1/1996 | Chan . |
| 5,513,353 | 4/1996 | Fujimoto . |
| 5,535,350 | 7/1996 | Maemura . |
| 5,553,262 * | 9/1996 | Ishida et al. .......................... 711/123 |
| 5,574,883 | 11/1996 | Freeman . |
| 5,640,531 | 6/1997 | Whittaker et al. . |
| 5,724,548 | 3/1998 | Takahashi et al. . |
| 5,732,241 | 3/1998 | Chan . |
| 5,857,214 * | 1/1999 | Dey ...................................... 711/212 |

FOREIGN PATENT DOCUMENTS

| 1-133162 | 5/1989 | (JP) . |
| 4-21044 | 1/1992 | (JP) . |
| 5-12454 | 1/1993 | (JP) . |
| 5-342100 | 12/1993 | (JP) . |
| 6-67975 | 3/1994 | (JP) . |
| 6-161891 | 6/1994 | (JP) . |
| 6-324940 | 11/1994 | (JP) . |
| 7-84971 | 3/1995 | (JP) . |
| 7-334422 | 12/1995 | (JP) . |

* cited by examiner

*Primary Examiner*—Matthew Kim
*Assistant Examiner*—Matthew D. Anderson
(74) *Attorney, Agent, or Firm*—Jacobson Holman, PLLC

(57) ABSTRACT

A combined cache with main memory and a control method thereof, which can be configured with various structures of cache by only adding a minimized control circuit in order to be used as main memory. The N-way cache memory system includes N cache memory blocks receiving a tag field and an offset field of an address bus, a logic OR element for performing a logic OR operation with way hit signals from each cache memory block and for generating a cache hit signal when a way hit signal is produced in one of the cache memory blocks, and a first selection element for outputting data to a data bus, which results from the cache memory blocks in response to the way hit signal.

20 Claims, 9 Drawing Sheets

COMBINED CACHE WITH MAIN MEMORY AND A CONTROL METHOD THEREOF

BACKGROUND OF THE INVENTION

The present invention relates to a cache device, more particularly to a combined cache with main memory and a control method thereof, in which an internal cache of a microprocessor is used for both caching function and main memory function.

A large capacity of cache is provided within a high performance microprocessor in order to improve the performance of the processor. As is well known, cache is a storage medium for storing a data to be frequently used, in which the data is previously read out from another storage medium having relatively lower access speed (i.e. main memory). Since the access to the cache is faster than that to the main memory, a required data can be quickly transferred to the microprocessor, thereby improving the performance of the system.

Most of computer systems use as a main memory a DRAM (Dynamic Random Access Memory) which is cheap and can be easily used for implementing large quantity of main memory. Alternatively, as a cache is used a SRAM (Static Random Access Memory), which is faster in access speed though the cost is high. Due to the development of personal computers, 16 kilobytes of internal cache is embedded into Pentium processor, while 512 kilobytes of SRAM cache are further embedded into Pentium Pro processor other than 16 kilobytes of internal cache.

'Cache hit' represents the case that the data required can be fetched from a cache without access to a main memory because the data is stored in the cache, while 'cache miss' represents the case that the data required should be fetched from the main memory because the data is not stored in the cache. In the case of cache miss, if there is any vacant space in the cache, some parts located nearby the currently accessed data are read out from the main memory to be stored into the cache, considering their locality. Alternatively, if there is no vacant space in the cache, a replacement algorithm can be used for selecting a needless data block from the cache, and the selected block of the cache is then used for storing the data block related to the currently accessed data from the main memory.

As cache memory, there is included a fully associative mapped cache, a directly mapped cache, an N-way cache and so on. The fully associative mapped cache uses the entire address as tag so that the entire address of data is stored into a tag register of cache when the data is loaded into the cache. The directly mapped cache is proposed for improving the hardware complexity of the fully associative mapped cache, in which the entire address of data can be divided into 2 fields: a tag field and an offset field, and used for the control of the cache. Also, the N-way cache that increases data storage by n-times is proposed for increasing the cache hit rate.

FIG. 1 is a diagram for schematically illustrating the address bus of the directly mapped cache and the N-way cache, in which the address bus can be divided into a tag field and an offset field, for the control of the directly mapped cache and the N-way cache.

Here, during data loading, the directly mapped cache stores the tag field of address into the tag register of the cache. During data reading, the directly mapped cache responds to the offset field to determine if the data can be read out from which data register within the cache.

The N-way cache stores the tag field of the address into the tag register of the cache during data loading, and determines which data can be read out from a certain way in response to the offset field during data reading.

For the convenience of explanation, it is assumed that the address is 16 bits, the offset field 2 bits, the tag field 14 bits, the data bus 8 bits and there are 4 ways.

FIG. 2 is an internal block diagram of a conventional 4-way cache used only as cache function, which includes 4 ways (way_0, way_1, way_2 and way_3), an OR gate 10 and a multiplexer 11. Each of 4 ways receives corresponding tag field and corresponding offset field of the address bus, respectively. The OR gate 10 performs a logic OR operation on output signals applied from four ways, so as to generate a cache hit signal when any one of four ways allows a way hit to occur. The multiplexer 11 selectively transfers one of data applied from four ways, in response to way hit signals applied from four ways.

FIG. 3 is an internal block diagram of one of 4 ways shown in FIG. 2. The way includes a tag register 30, a comparator 31, a tag hit latch 32, four 8-bit data registers 33, a multiplexer 34, four 1-bit valid bit registers 35, a multiplexer 36, an AND gate 37. The tag register 30 stores 14-bit tag field applied through the address bus when the data is loaded into the cache. The comparator 31 compares the tag value stored in the tag register 30 with the tag value of the address inputted through the address bus for reading out from the cache. The tag hit latch 32 stores the compared result signal from the comparator 31 as a tag hit signal. Each of four 8-bit data registers 33 stores the data loaded from the main memory into the cache. The multiplexer 34 selectively outputs one of the data stored in four 8-bit data registers 33, in response to the 2-bit offset field of the address inputted through the address bus. Each of four 1-bit valid bit registers 35 stores corresponding valid bit indicating whether the data stored in the corresponding one of four data registers 33 is valid or not. The multiplexer 36 selectively outputs one of the content of four 1-bit valid bit registers 35, in response to the 2-bit offset field of the address inputted through the address bus. The AND gate performs an logic AND operation on the tag hit signal from the tag hit latch 32 and the valid bit from the multiplexer 36, so as to produce the result as a way hit signal.

The operation of the 4-way cache as configured above will be explained.

First, the comparator in the respective ways compares the value of tag field of the address bus applied for reading out from the cache with the content of the tag register 30. When the compared result indicates that the value of the tag field is the same as the value stored in the tag register 30, 'tag hit signal' is generated so that the tag hit latch 32 is set to "1", and the multiplexer 34 selectively produces one among four data registers 33 to the data bus, in response to the 2-bit offset field of the inputted address bus. Also, the multiplexer 36 selects and produces the corresponding valid bit to the selected data register as an offset field. Here, when the tag hit signal stored in the tag hit latch 32 is "1" and the selected valid bit from the multiplexer 36 is "1", the way hit signal becomes "1".

Next, a cache hit signal is produced, based on respective way hit signals generated as above, and the data outputted from the way generating the way hit signal is finally transferred to the data bus for the microprocessor.

The capacity of cache becomes larger, and the memory must be required in order to store the data for the control of microprocessor and micro-controller. Considering this point, when a microprocessor embedded with large amount of cache is used as a CPU (Central Process Unit) of a computer system having a large amount of memory; the internal cache memory is used for cache-unique purpose. On the other hand, when the microprocessor embedded with cache is used for system control that requires relatively small amount of memory but high speed processing, the internal cache is used as a main memory, thereby increasing the processing speed of the system and maximizing the utility of the cache.

SUMMARY OF THE INVENTION

The present invention is proposed, considering the above-mentioned requirements. The object of the present invention is to provide a combined cache with main memory and a control method thereof, which can be configured by only adding a minimized control circuit to one of various structures of cache that is used for main memory function.

Further, the other object of the present invention is to provide a combined cache with main memory and a control method thereof, which performs both cache memory function and main memory function, thereby maximizing the utility of the cache.

To accomplish the above objects of the present invention, there is provided an N-way cache memory system including N cache memory blocks receiving a tag field and an offset field of an address bus, a logic OR element for performing a logic OR operation with way hit signals from each cache memory block and for generating a cache hit signal when a way hit signal is produced in one of the cache memory blocks, and a first selection element for outputting to a data bus a data which is resulted from the cache memory blocks in response to the way hit signal, wherein each cache memory blocks comprising: a second selection element for selectively outputting the tag field received from the address bus when a data from a main memory is loaded into the cache memory system and a value which is set to each cache memory block, in response to a cache/memory signal; a tag register for storing a tag value from the second selection element; a comparison element for comparing the tag value stored in the tag resister with the tag field on the address bus which is provided for reading out a data from the cache memory system; a tag latch circuit for storing a result of the comparison element as a tag hit signal; a plurality of data registers for storing data loaded from the main memory; a third selection element for selectively outputting data stored in the plurality of data registers in response to the offset field on the address bus which is provided for reading out data from the cache memory system; a plurality of valid bit registers for storing valid bits indicative of a validity of data stored in the plurality of data registers; a fourth selection element for selectively outputting the valid bits stored in the plurality of valid bit registers in response to the offset field of the address bus; and a logic operation element for performing a logic AND operation with the tag hit signal from the tag hit latch circuit and the valid bit from the fourth selection element.

BRIEF DESCRIPTION OF DRAWINGS

For a more complete understanding of the present invention and the advantage thereof, reference is now made to the following description taken in conjunction with the accompanying drawings in which.

DETAILED DESCRIPTION OF THE INVENTION

Hereinafter, the preferred embodiments of the present invention will be in detail explained.

Figure 1:
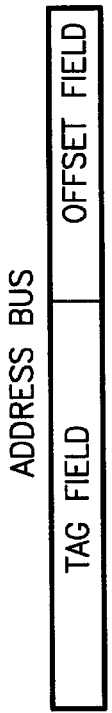
FIG. 1 is a diagram for schematically illustrating an address bus for a directly mapped cache and an N-way cache.
Figure 2:
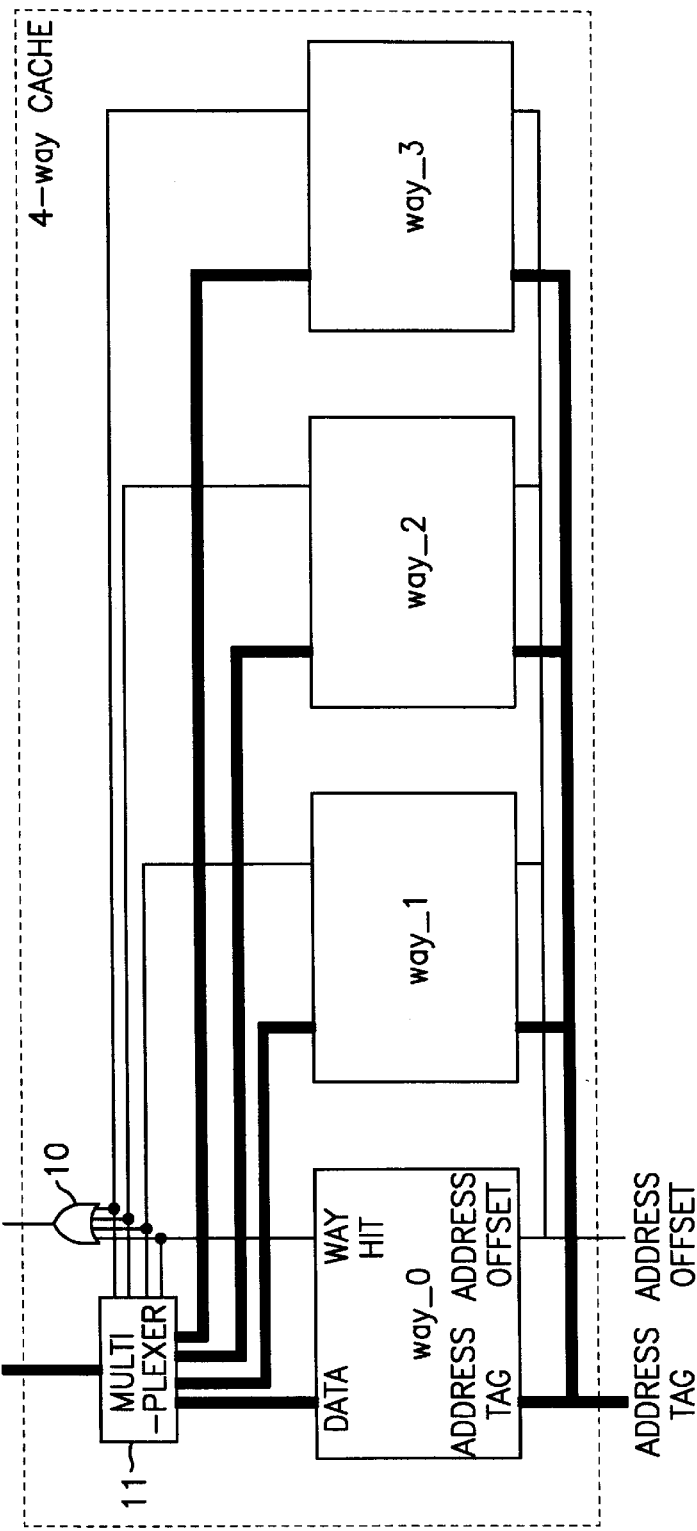
FIG. 2 is an internal block diagram of a conventional 4-way cache used only as a cache.
Figure 3:
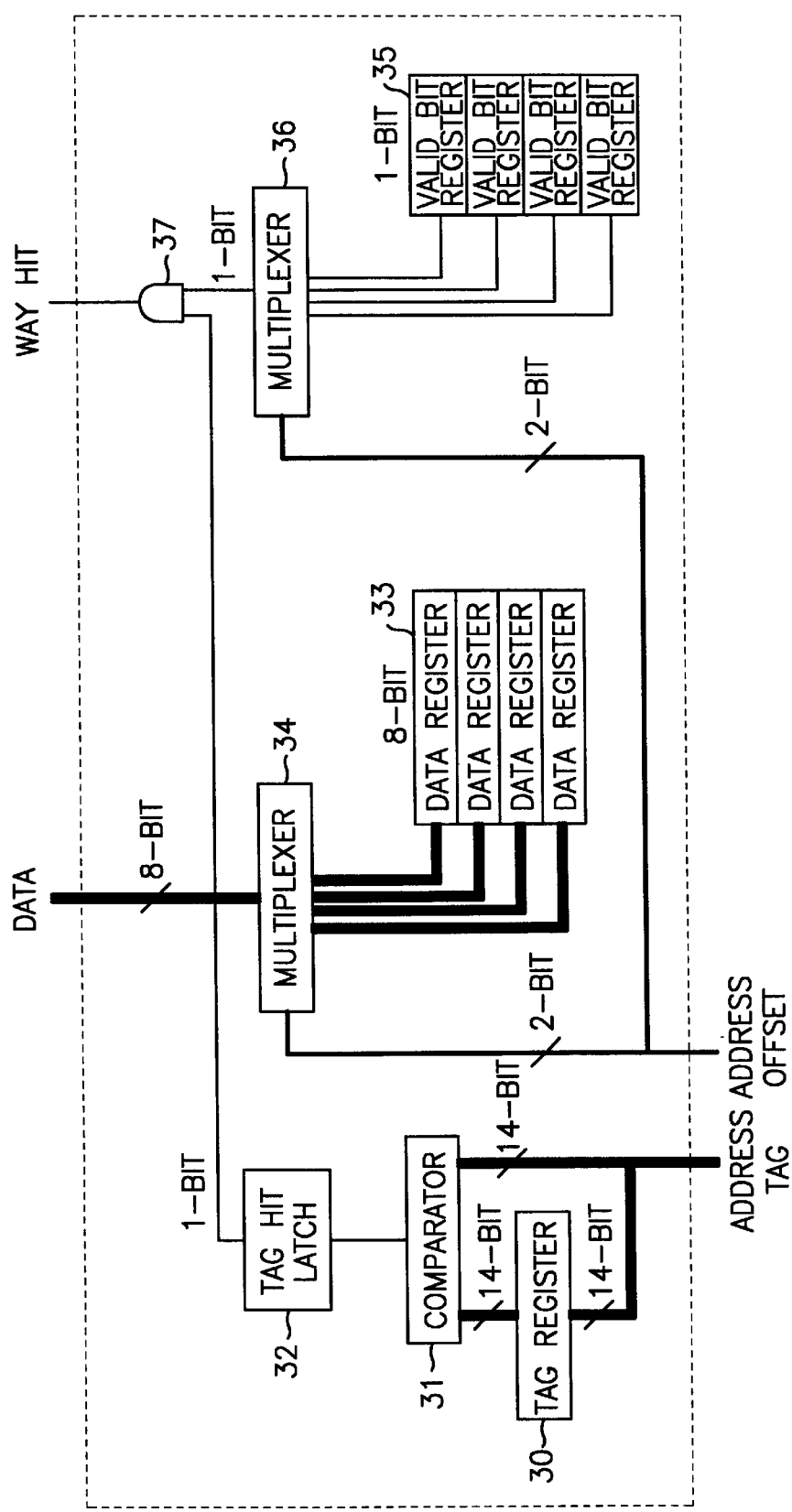
FIG. 3 is an internal block diagram of one of 4 ways shown in FIG. 2.
Figure 4:
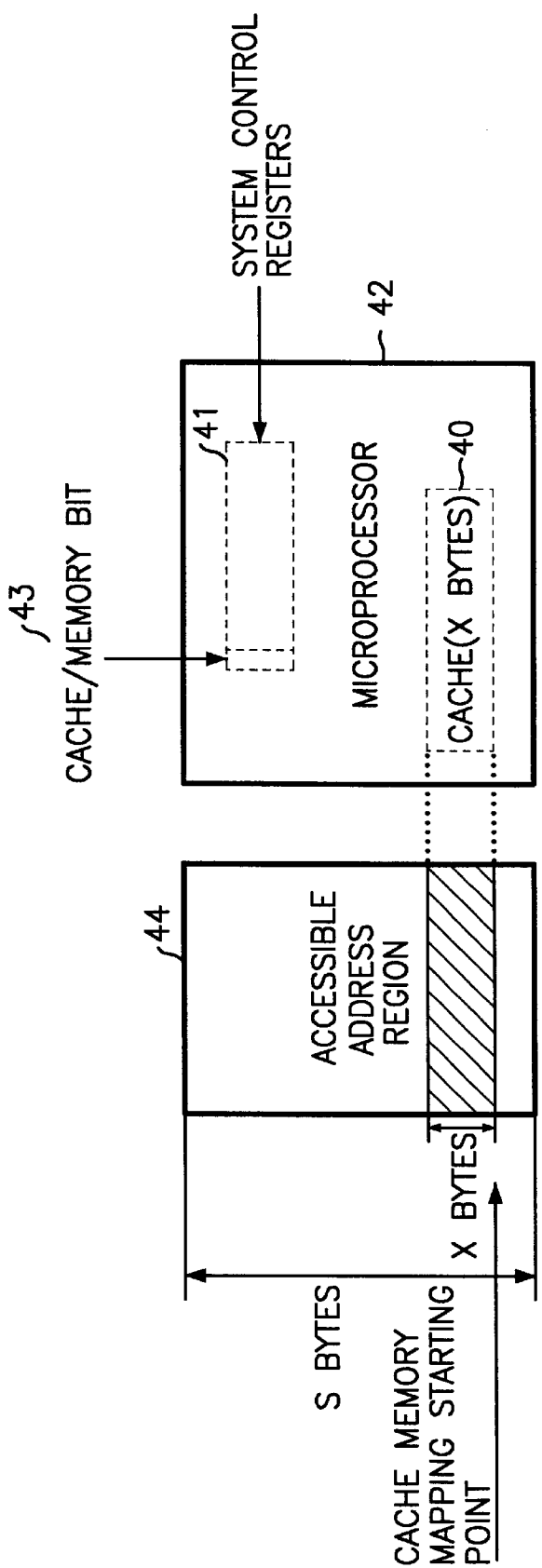
FIG. 4 is a schematic diagram of a computer system for illustrating a combined cache with main memory.

FIG. 4 is a schematic diagram of a computer system for schematically illustrating a combined cache with main memory according to the present invention.

As shown in the drawing, the computer system includes a microprocessor and a main memory. The microprocessor includes an X-byte of internal cache 40 and a system control register 41 for controlling hardware parts of microprocessor, and the main memory can be accessed by the microprocessor and the size of the main memory region accessible is S bytes. Here, respective bits of some part of the system control registers 41 are used for controlling corresponding parts of the hardware for the microprocessor and the other parts of them are reserved for future use. The present invention takes advantage of one bit of the reserved bits of the system control registers 41 as a cache/memory bit 43. Based on the value of the cache/memory bit 43, the determination is made whether the cache memory is used as cache function or as main memory function. For example, it is assumed, that the value "1" of the cache/memory bit 43 indicates that the cache memory is used for main memory function, while the value "0" of the cache/memory bit 43 indicates that the cache memory is used for cache function. Also, the size of the cache memory 40 (or X value of X bytes) is preferably set to the value making the performance of microprocessor maximized when the microprocessor is designed. The size of the memory region accessible (or S value of S bytes) is determined to the bit number of the address bus of the microprocessor. For example, when the address is 10 bits, the value of S is set to 1024 (or 10th power of $2(=2^{10})$).

The hatching region in the drawing indicates the accessible region when the cache is used as main memory function. This accessible region is extended from the cache memory mapping starting point by the size of the cache memory. For example, when the cache memory mapping starting point is "0", the addresses for the cache mapping region extends from "0" to "(X-1)".

Figure 5:
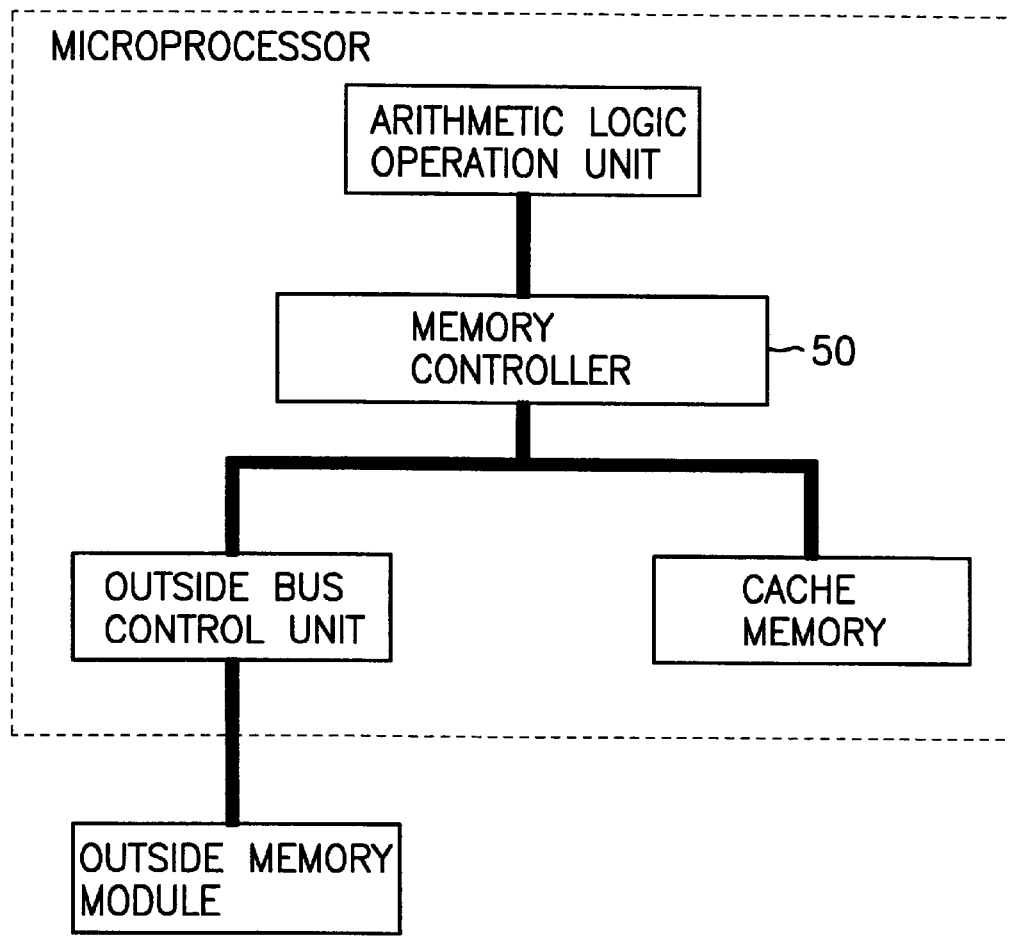
FIG. 5 is a diagram for schematically illustrating a hardware configuration of the combined cache with main memory.

FIG. 5 schematically illustrates the hardware configuration of the combined cache with main memory, which is substantially similar in structure to a general microprocessor embedded with a cache therein. However, when the microprocessor is used for system control, the control method of the memory controller 50 should be changed to the algorithm shown in FIG. 6 in order that the internal cache is used as main memory.

Figure 6:
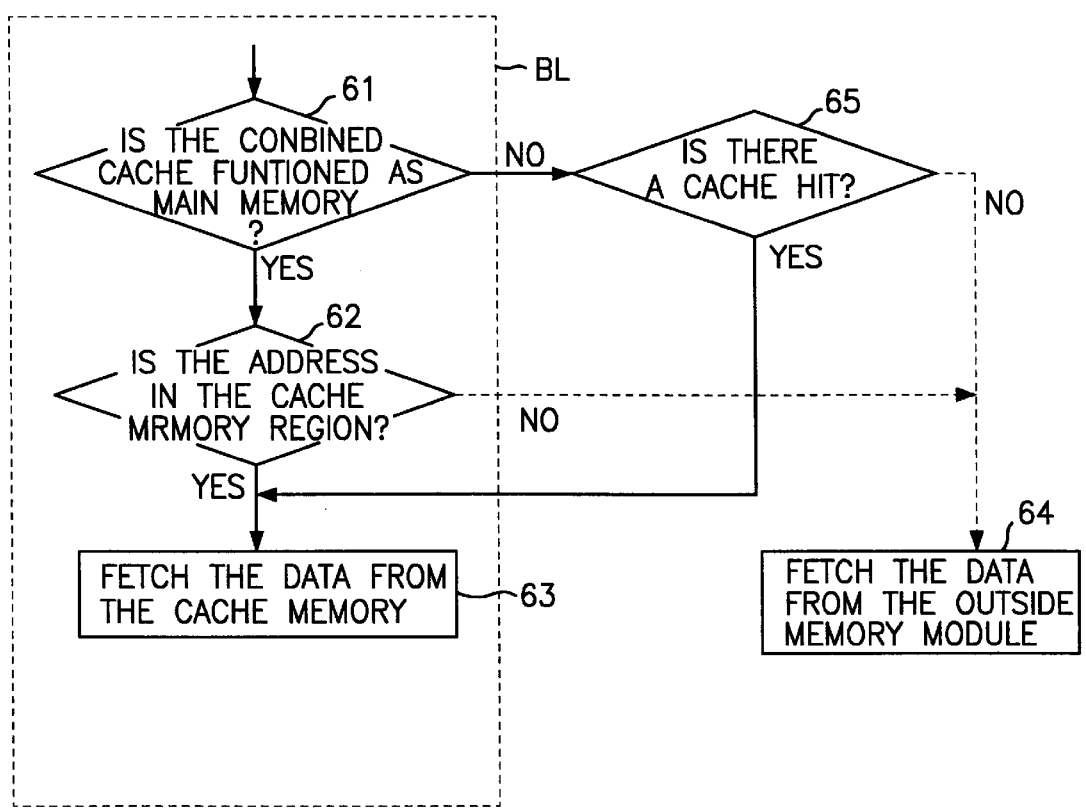
FIG. 6 is a flowchart for illustrating a method of memory controller, which is for fetching a data from main memory.

FIG. 6 is a flowchart for illustrating the control method of memory controller that fetches data from the main memory, in which the portion of block BL in particular shows the control method of the present invention. Referring to FIG. 6 for explaining in detail the control method of the present invention, there is included a first step (61) for confirming the cache/memory bit 43 of the system control register 41 within the microprocessor; a second step(62) for determining whether the address for the case of the cache being used as main memory function exists in the cache memory mapping region if the result of the first step indicates that the cache/memory bit 43 is "1"; and a third step(63 and 64) for fetching data from an outside memory module (or main memory) if the result of the second step indicates that the address does not exist in the memory mapping region(see 64), and for fetching data from the cache memory, if the address exists in the cache memory region.

In the first step, if the cache/memory bit 43 is "0" (that is the cache is used as cache function), the process proceeds to a general cache algorithm so as to confirm whether any cache hit occurs or not and so on. Here, the general cache algorithm for the case that the value of the cache/memory bit 43 is "0" will be omitted because it is well known in this art.

The present invention is made based on the above-mentioned method. The combined cache with main memory is implemented such that, when the microprocessor is used for system control, the data existing in the cache memory mapping region is accessed from the cache memory, while the other data (that is the data existing not in the cache memory mapping region but the outside region thereof) is accessed from the outside memory block (which is used only for main memory), in order to utilize the internal cache of the microprocessor as main memory function.

Figure 7:
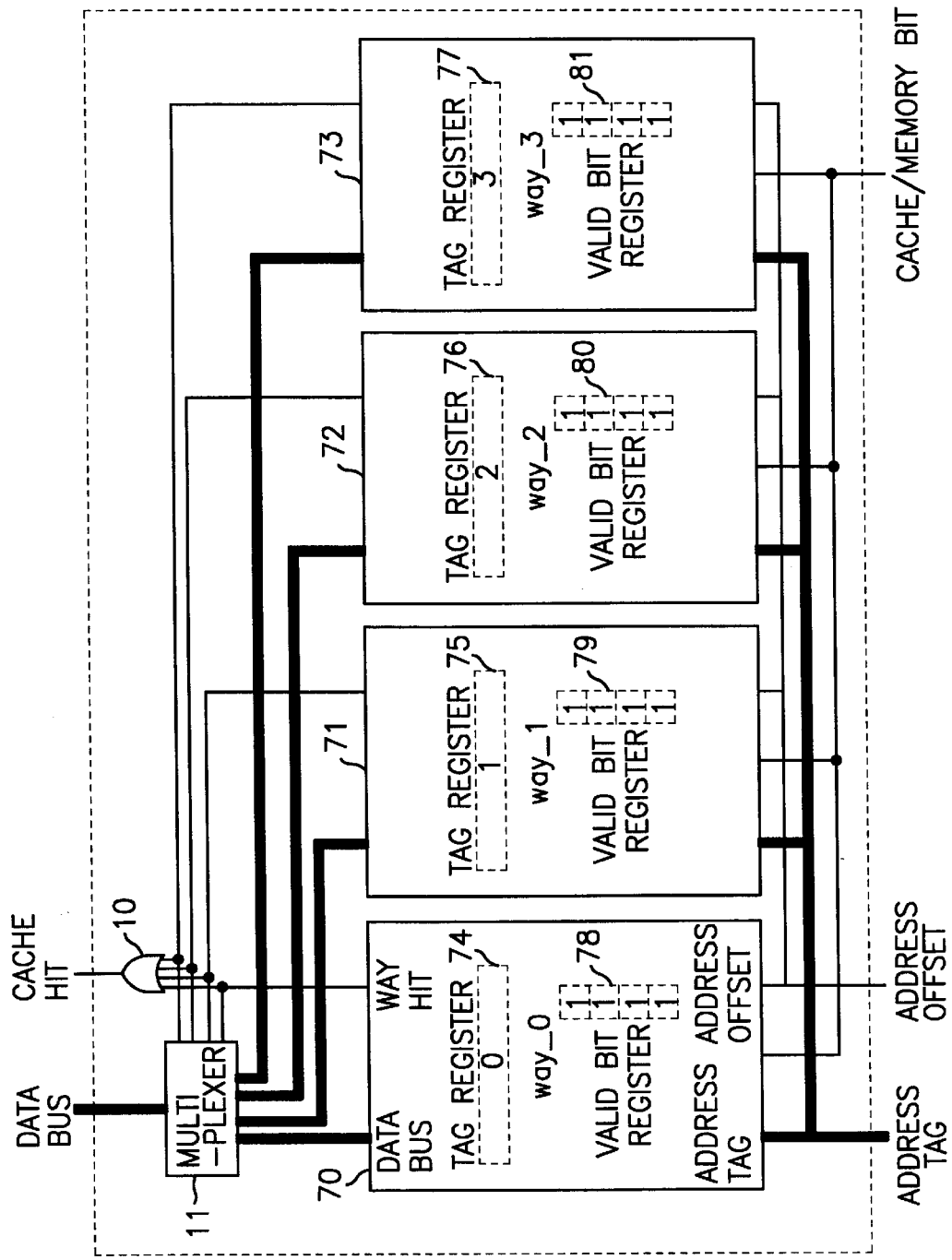
FIG. 7 is a block diagram of 4-way cache according to one preferred embodiment of the present invention.

FIG. 7 is a block diagram of 4-way cache according to one preferred embodiment of the present invention, which includes four ways 70, 71, 72 and 73, an OR gate 10 and a multiplexer 11. Each of four ways 70, 71, 72 and 73 receives the tag field and the offset field of the address bus. The OR gate 10 performs a logic OR operation on way hit signals from four ways so as to generate a cache hit signal when a way hit is made in any one of four ways. The multiplexer 11 selectively transfers one of four data applied from four ways to the data bus, in response to respective way hit signal from four ways.

The 4-way cache of the present invention configured as above, is similar to the conventional one, except for the internal configuration of respective ways. This exception will be explained in the following.

In order to use the portion from address "0" to address "15" among the 4-way cache of the present invention as main memory function, tag registers 74, 75, 76, 77 of respective ways are firstly set to the same value with the number of respective ways. In other words, the tag register 74 of way_0 (70) is set to "0"; the tag register 75 of way_1 (71) to "1"; the tag register 76 of way_2 (72) to "2"; and the tag register 77 of way_3 (73) to "3". Also, valid bit registers 78, 79, 80 and 81 of respective ways are all set to "1".

Here, the mapping starting point can be started at different address from address "0". As for this, setting values of tag registers are suitably modified. For example, if the mapping is made from the address "1000H" to the address "100FH" in hexadecimal notation, tag register values of respective ways are set to "400H", "401H", "402H" and "403H", respectively.

Figure 8:
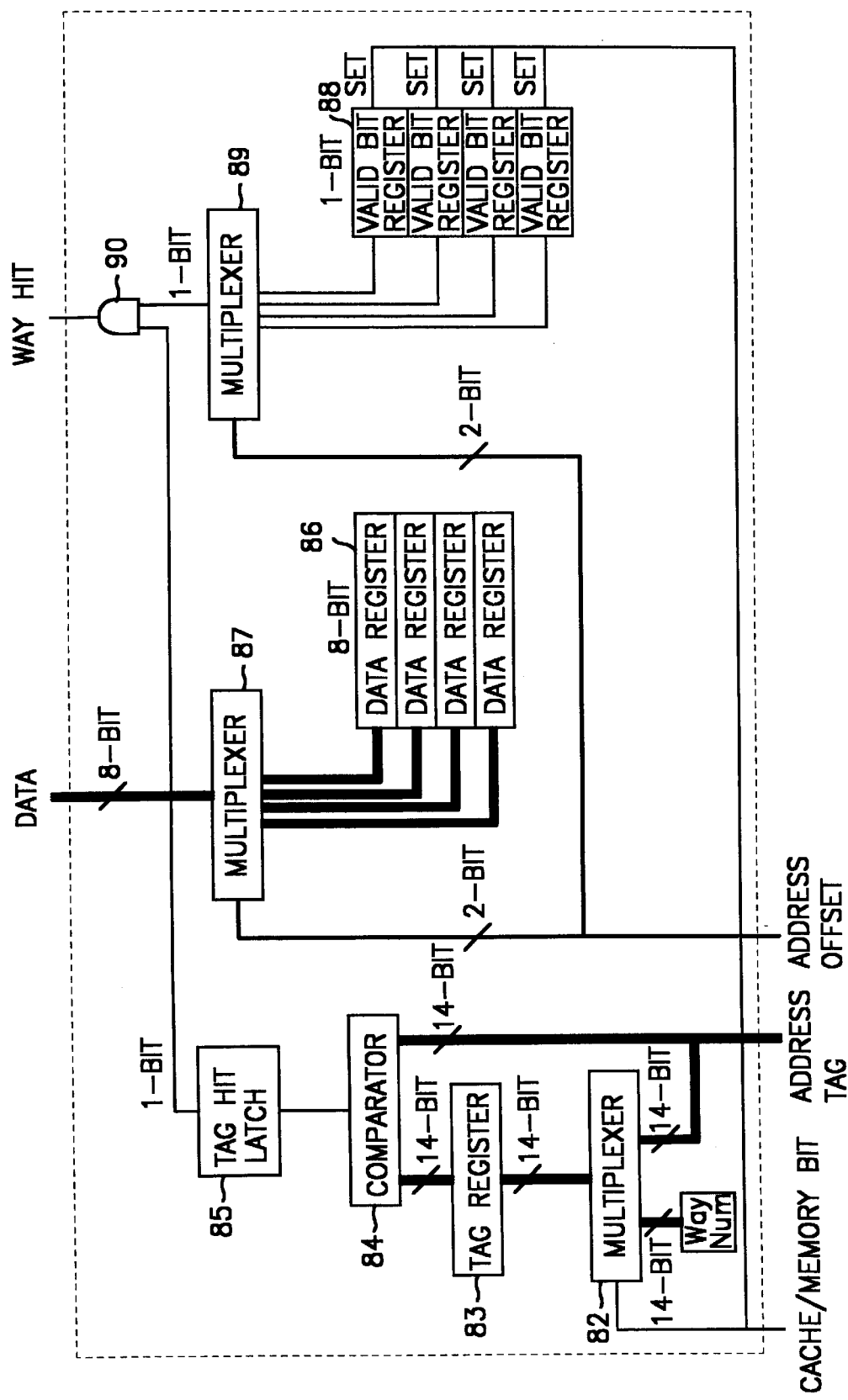
FIG. 8 is an internal block diagram for one way among the 4-way cache of FIG. 7, according to one preferred embodiment of the present invention.

FIG. 8 is a block diagram of a way in the 4-way cache shown in FIG. 7 according to one preferred embodiment of the present invention, which includes multiplexers 82, 87 and 89, a tag register 83, a comparator 84, a tag hit latch 85, four 8-bit data registers 86, four 1-bit valid bit registers 88, and an AND gate 90. The multiplexer 82 selectively outputs one between the 14-bit tag field applied through the address bus and the value (Way Num) set to corresponding way number in response to the cache/memory bit, when data is loaded into the cache. The tag register 83 stores the tag value from the multiplexer 82. The comparator 84 compares the stored tag value in the tag register 83 with the tag field value of the address bus inputted for reading out data from the cache memory. The tag hit latch 85 stores the compared result signal from the comparator 84 as a tag hit signal. Each of four 8-bit data registers 86 stores the loaded data from the main memory to the cache. The multiplexer 87 selectively outputs the data stored in the corresponding data register among four 8-bit registers 86 in response to the 2-bit offset field of the address bus applied. Each of four 1-bit valid bit registers 88 stores corresponding valid bit indicating whether the stored data in the corresponding register of four data registers 86 is valid or not, and is set to "1" in response to the cache/memory bit. The multiplexer 89 selectively outputs one of the content of four 1-bit valid registers 88 in response to the 2-bit offset field of the address bus applied. The AND gate performs on the tag hit signal from the tag hit latch 85 and the valid bit from the multiplexer 89, so as to produce the result as a way hit signal.

Here, the multiplexer 82 receives the cache/memory bit as a control signal. When the combined cache is used for cashing (when the cache/memory bit is "0"), the multiplexer 82 selects the tag field of the address inputted through the address bus, so as to produce the selected one to the tag register 73. Alternatively, when the combined cache is functioned as main memory (that is when the cache/memory bit is "1"), the multiplexer 82 selects the set value (Way Num) to the corresponding way number, so as to produce the selected one to the tag register 73.

Four 1-bit valid bit registers 88 are always set to "1" when the cache/memory bit is "1" (in other words, when the combined cache is functioned as main memory).

Referring to FIG. 8, it will be explained that the 4-way cache of the present invention is functioned as main memory according to the method of one preferred embodiment of the present invention.

Let's consider that the data existing in the address "7" within the cache memory mapping region is accessed. The cache/memory bit is "1" and the tag field value for the address "7" except for the lowest 2-bit offset field among the 16-bit address value is "1". Since the cache/memory bit is "1", the multiplexer 82 selects the set value to the corresponding way number (Way Num) so as to store the selected one into the tag register 83. The stored content in the tag register 83 is also compared with the tag field value "1" of the address "7" by respective comparators 84 of ways. Since the tag field value is the same as the stored tag value in the tag register 83 of the way_1 (71), the tag hit signal of way_1 becomes "1", thereby setting the tag hit latch 85. At this time, the cache/memory bit of "1" makes all of the four valid bit registers set to "1", so that a way hit is generated through the multiplexer 89 and the AND gate 90 of the way_1. In response to the offset field value (or "11" in the binary notation) of the inputted address "7", the content of corresponding data register among four data registers 86 is selected so as to be transferred to the data bus.

Thus, the 4-way cache selects the data from the way_1 (71) in which a way hit is made, so as to transfer the selected data to the data bus and produce a cache hit signal through the OR gate 10.

Next, considering that the data existing in the address 100H in hexadecimal notation (which is located outside of the cache memory mapping region) is accessed, the tag field of the address 100H is "40H". Such tag value does not match any value stored in tag registers of respective ways. Thus, no cache hit signal is generated and the microprocessor should read from or write to outer memory module.

Figure 9:
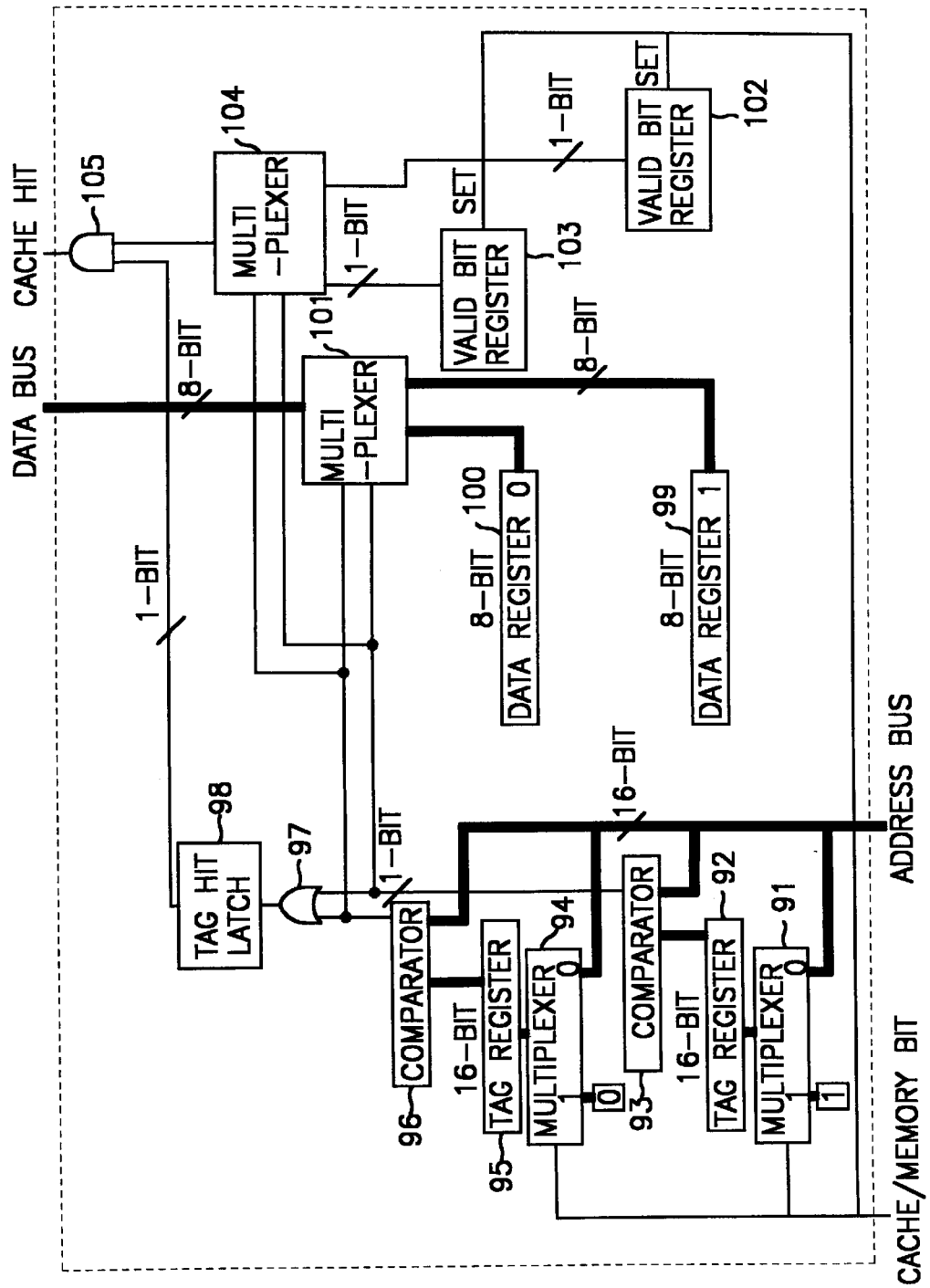
FIG. 9 is a block diagram of a cache having fully associative mapped structure, according to another preferred embodiment of the present invention.

FIG. 9 is a block diagram of a cache having fully associative mapped structure, according to one preferred embodiment of the present invention. This combined cache includes a multiplexer 94, a tag register 95, a comparator 96, a multiplexer 91, a tag register 92, a comparator 93, an OR gate 97, a tag hit latch 98, two 8-bit data registers 99 and 100, a multiplexer 101, two 1-bit valid bit registers 102 and 103, a multiplexer 104 and an AND gate 105.

The multiplexer 94 selects one between the 16-bit address applied through the address bus when the data is loaded into the cache (As for the cache having fully associative mapped structure, the entire address is used as tag field as mentioned above), and the value "0" (which is an address corresponding to the first address of the cache memory mapping region), in response to the cache/memory bit. The tag register 95 stores the tag value from the multiplexer 94. The comparator 96 compares the stored value in the tag register 95 with the address inputted through the address bus for reading out data from the cache. The multiplexer 91 selectively produces one of the 16-bit address applied through the address bus when the data is loaded into the cache and the value "1" (which is the address value corresponding to the second address of the cache memory mapping region), in response to the cache/memory bit. The tag register 92 stores the tag value from the multiplexer 91. The comparator 93 compares the stored value in the tag register 92 with the address applied through the address bus for reading out data from the cache. The OR gate 97 performs a logic OR operation on compared results from two comparators 93 and 96. The tag hit latch 98 stores the output of the OR gate 97 as a tag hit signal. Each of two 8-bit data registers 99 and 100 stores the loaded data from the main memory to the cache. The multiplexer 101 selectively outputs one of stored data in two 8-bit data registers 99 and 100 to the data bus, in response to the compared result signal from two comparators 93 and 96. Each of two 1-bit valid bit registers 102 and 103 stores a valid bit indicating whether the stored data in the corresponding data register 99 or 100 is valid or not, and is set to "1" in response to the cache/memory bit. The multiplexer 104 selectively outputs one of valid bits from two valid bit registers 102 and 103 in response to the compared result signal from two comparators 93 and 96. The AND gate 105 performs a logic AND operation on valid bits applied from the tag hit latch 98 and the multiplexer 104, so as to produce the result as a cache hit signal.

The inputted address through the address bus is compared with stored values in respective tag registers 92 and 95 by comparators 93 and 96, respectively, so that the tag hit latch 98 is set when the inputted address is the same as one of the stored value in tag registers. Further, a determination is made whether the valid bit of 1-bit valid bit register corresponding to the tag register (where there is a tag hit) is set to "valid". If the tag hit signal of the tag hit latch 98 is "1" and the valid bit is "1", a cache hit is generated and the value of the data register where tag hit is generated among data registers is loaded into the data bus.

Here, the multiplexer 94 receives the cache/memory bit as a control signal. Then, the multiplexer 94 selects the inputted address through the address bus so as to produce it to the tag register 95 in the case of cache function (that is, when the cache/memory bit is "0"), while the multiplexer 94 selects the value "0" so as to produce to the tag register 95 for main memory function (that is, when the cache/memory bit is "1"). The multiplexer 91 also receives the cache/memory bit as a control signal. Then the multiplexer 91 selects the inputted address through the address bus to produce it to the tag register 92 in the case of cache function (that is, when the cache/memory bit is "0"), while the multiplexer 91 selects the value "1" so as to produce to the tag register 92 in the case of main memory function (that is, when the cache/memory bit is "1"). In order to change the mapping address starting point to a certain address other than address "0", values stored in respective tag registers should be suitably modified for the main memory function. For example, in order that the mapping is made from the address "1000H" to the address "1001H" in hexadecimal notation, tag registers 0 and 1 are set to "1000H" and "1001H" in hexadecimal notation, respectively.

Referring to FIG. 9, there will be explained a combined cache with main memory having fully associative structure according to one preferred embodiment of the present invention.

Lets consider that the data existing in the address "1" within the cache memory mapping region is accessed. The cache/memory bit is "1" and tag registers 95 and 92 are set to "0" and "1" by means of multiplexers 91 and 94, respectively. Since the address value (or "1") of the address bus inputted through comparators 93 and 96 are the same as the tag value of the tag register 92, the comparator 93 produces "1" and the OR gate 97 produces "1" to be stored in the tag hit latch 98. At this time, based on the compared result signal applied from the comparator 93, the value in data register 99 is selected by the multiplexer 101 to be transferred to the data bus. In addition, when the cache is used as main memory function, since 1-bit valid bit registers 102 and 103 are all set to "1", the output of the multiplexer 104 is "1". This output value of "1" of the multiplexer 104 is logic-AND operated with the latched value "1" of the tag hit latch 98, so as to produce the AND operated result as a cache hit signal.

Next, let's consider that the data existing in the address 100H outside of the cache memory mapping region is accessed. Since the address 100H is not the same as any pre-set tag value, there is no cache hit so that the microprocessor should read out from or write to outside memory module.

Figure 10:
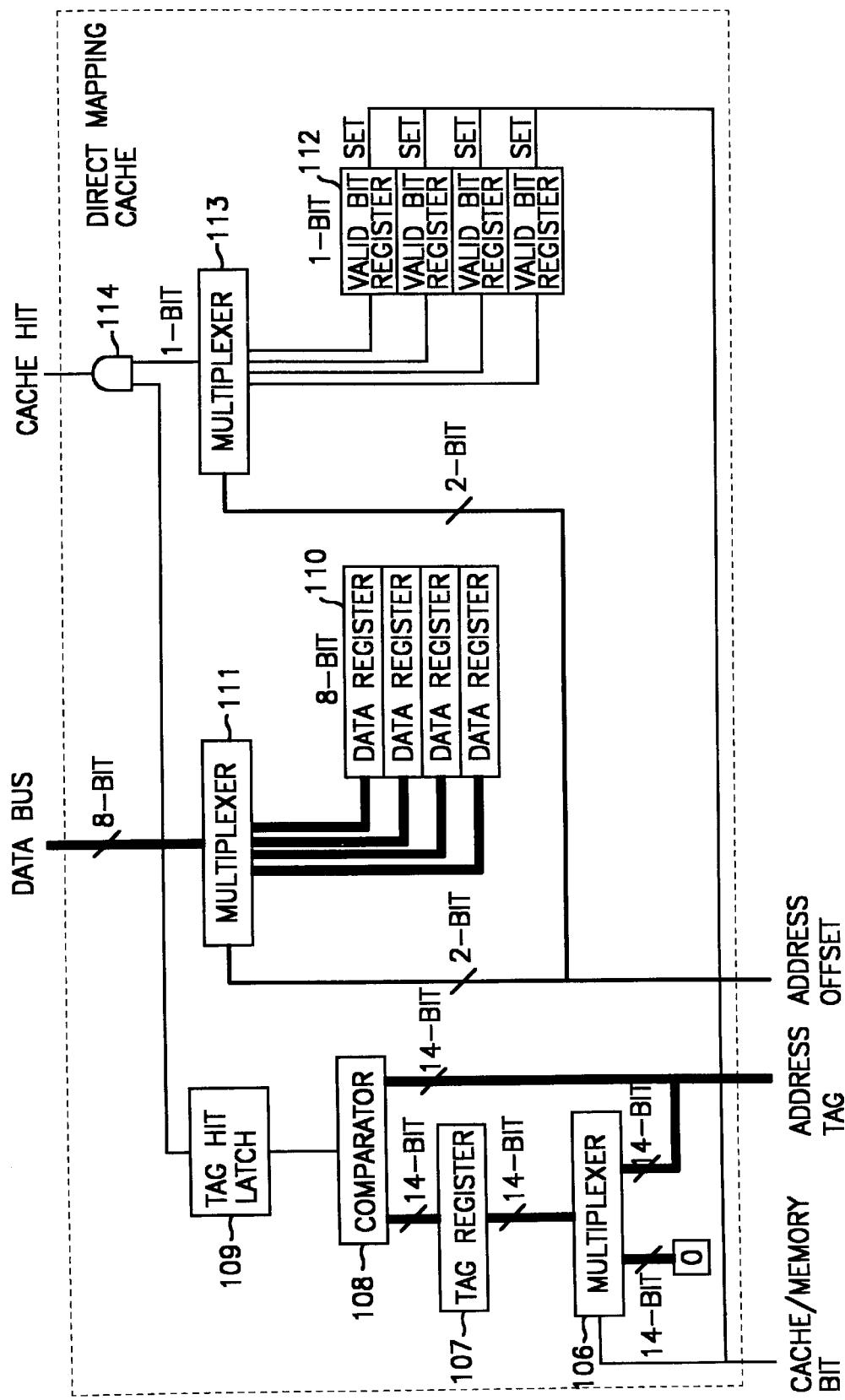
FIG. 10 is a block diagram of a cache having directly mapped structure, according to still another preferred embodiment of the present invention.

FIG. 10 is a block diagram of a combined cache with main memory having a directly mapped structure, according to another preferred embodiment of the present invention. The combined cache includes multiplexers 106, 111 and 113, a tag register 107, a comparator 108, a tag hit latch 109, four 8-bit data registers 110, four 1-bit valid bit registers 112 and an AND gate 114. The multiplexer 106 selectively outputs one between the 14-bit tag field applied through the address bus and the value "0" corresponding to the starting point of the cache memory mapping region in response to the cache/memory bit, when data is loaded into the cache. The tag register 107 stores the tag value from the multiplexer 106. The comparator 108 compares the stored tag value in the tag register 107 with the tag field value of the address bus inputted for reading out data from the cache memory. The tag hit latch 109 stores the compared result signal from the comparator 108 as a tag hit signal. Each of four 8-bit data registers 110 stores the loaded data from the main memory to the cache. The multiplexer 111 selectively outputs the data stored in the corresponding data register among four 8-bit registers 110, in response to the 2-bit offset field of the address bus applied. Each of four 1-bit valid bit registers 112 stores corresponding valid bit indicating whether the stored data in the corresponding register of four data registers 110 is valid or not, and is set to "1" in response to the cache/memory bit. The multiplexer 113 selectively outputs one of the content of four 1-bit valid registers 112, in response to the 2-bit offset field of the address bus applied. The AND gate performs a logic AND operation with the tag hit signal from the tag hit latch 109 and the valid bit from the multiplexer 113, so as to produce the result as a cache hit signal.

Here, the multiplexer receives the cache/memory bit as a control signal. Then, the multiplexer 106 selects the tag field of the address inputted through the address bus so as to produce it to the tag register 107, when the combined cache is used for caching function (or when the cache/memory bit is "0"). Alternatively, when the combined cache is functioned as main memory (that is when the cache/memory bit is "1"), the multiplexer 106 selects the set value (e.g."0" in this embodiment) to the starting address of the cache memory mapping region, so as to produce the selected one to the tag register 107. In order to change the mapping address starting point to a certain address other than address '0', values stored in respective tag registers should be suitably modified when the combined cache is used for main memory function. For example, in order to set the address starting point to address 1000H in hexadecimal notation, the tag value of the starting address is set to "400H".

Referring to FIG. 10, there will be explained a combined cache with main memory having directly mapped structure according to another preferred embodiment of the present invention.

Lets consider that the data existing in the address "2" within the cache memory mapping region is accessed. Since the cache/memory bit is "1", the multiplexer 106 selects the tag value "0" (which is the starting address of the cache memory mapping region), and then the output of the multiplexer 106 is stored in the tag register 107. The comparator 108 compares the stored value ("0") in the tag register 107 with the tag field value ("0") of the address 2 (in which the 16-bit address is composed of the lowest 2-bit offset field and the tag field), so as to produce the result as a tag hit signal. At this time, since four valid bit registers 112 are all set to "valid" by means of "1" of the cache/memory bit, a cache hit is generated through the multiplexer 113 and the AND gate 114. Based on the offset field value ("10" in the binary notation) of the inputted address 2, a corresponding one of four data registers 110 is outputted to the data bus.

Next, lets consider that the data existing in the address 100H outside the cache memory mapping region is accessed. Since the tag field 40H of the address 100H is not the same as the stored tag value in the tag register 107, there is no cache hit so that the microprocessor should read out data from or write to outside memory module.

It will be understood by those skilled in the art that, though the embodiments of the present invention have been explained by example, 16-bit address bus, 8-bit data bus and 2-bit offset configuration, the teachings of the present invention can be applied to n-bit address bus, m-bit data bus and k-bit offset configuration.

As described above, according to the present invention, specific control circuit requiring small amount of hardware is incorporated into a general cache having various structure, so as to produce a combined cache with main memory. Thus, when a microprocessor having large amount of such a combined cache is used as general central processing unit (CPU) in a computer system, the combined cache is functioned as caching (or cache unique function). Also, when the microprocessor having large amount of such a combined cache is used for system control, the combined cache is used as main memory function. Thus, the present invention has advantages in that the utility of the cache is maximized and the cost for system control board can be reduced.

In addition, when the capacity of the embedded cache into a microprocessor is large enough, a system control board can be configured without any separate memory module. Also, even in the case the required memory amount is larger than the internal cache amount, since the separately required memory amount is relatively small, the size of outside memory module can be reduced. Thus, the present invention has a great advantage especially in cost view.

What is claimed is:

1. An N-way cache memory system including N cache memory blocks receiving a tag field and an offset field of an address bus, a logic OR means for performing a logic OR operation with way hit signals from each cache memory block and for generating a cache hit signal when a way hit signal is produced in one of the cache memory blocks, and a first selection means for outputting to a data bus a data which is resulted from the cache memory blocks in response to the way hit signal, wherein each cache memory blocks comprising:

a second selection means for selectively outputting the tag field received from the address bus when a data from a main memory is loaded into the cache memory system and a value which is set to each cache memory block, in response to a cache/memory signal;

a tag register for storing a tag value from the second selection means;

a comparison means for comparing the tag value stored in the tag resister with the tag field on the address bus which is provided for reading out a data from the cache memory system;

a tag latch circuit for storing a result of the comparison means as a tag hit signal;

a plurality of data registers for storing data loaded from the main memory;

a third selection means for selectively outputting data stored in the plurality of data registers in response to the offset field on the address bus which is provided for reading out data from the cache memory system;

a plurality of valid bit registers for storing valid bits indicative of a validity of data stored in the plurality of data registers;

a fourth selection means for selectively outputting the valid bits stored in the plurality of valid bit registers in response to the offset field of the address bus; and a logic operation means for performing a logic AND operation with the tag hit signal from the tag hit latch circuit and the valid bit from the fourth selection means.

2. The N-way cache memory system in accordance with claim 1, wherein the second selection means selects and outputs a value which is set to a way number corresponding to each cache memory block when the cache memory system functions as the main memory, or selects and outputs the tag field on the address bus in case where the cache memory system functions as the cache memory in response to the cache/memory signal.

3. The N-way cache memory system in accordance with claim 1, wherein each of the valid bit registers is established to be valid in case where the cache memory system functions as the main memory.

4. The N-way cache memory system in accordance with claim 2, wherein the way number corresponding to each cache memory block is programmable in response to a starting address point in a mapping region which is mapped into the main memory.

5. The N-way cache memory system in accordance with claim 1, wherein the cache/memory signal is programmed by an arbitrary bit in a system control register which control hardware in a microprocessor having the cache memory system, wherein the arbitrary bit is not used for a system control.

6. The N-way cache memory system in accordance with claim 1, wherein the cache memory block is used as the main memory when the cache/memory signal is in a high level and is used as the cache memory when the cache/memory signal is in a low level.

7. A cache memory system including a full associative mapping structure comprising;
   a first selection means for selectively outputting one out of an address on a address bus when a data is loaded into the cache memory system from a main memory and an address of a first mapping region in which the cache memory system is mapped into the main memory in response to a cache/memory signal;
   a first tag register for storing an address from the first selection means;
   a first comparison means for comparing the address stored in the first tag register with the address inputted from the address bus to read out data from the cache memory system;
   a second selection means for selectively outputting one out of an address on an address bus when a data is loaded into the cache memory system from the main memory and an address of a second mapping region in which the cache memory system is mapped into the main memory in response to the cache/memory signal;
   a second tag register for storing an address from the second selection means;
   a second comparison means for comparing the address stored in the second tag register with the address inputted from the address bus to read out data from the cache memory system;
   a first logic operation means for performing a logic OR operation with outputs from the first and second comparison means;
   a tag hit latch circuit for storing a tag hit signal produced by an output signal from the logic operation means;
   first and second data registers for storing data which are loaded into the cache memory system from the main memory, respectively;
   a third selection means for selectively outputting data stored in the first and second registers in response to the outputs from the first and second comparison means;
   first and second valid bit registers for storing valid bits indicative of a validity of data stored in the first and second data registers;
   a fourth selection means for selectively outputting the valid bits stored in the first and second valid bit registers in response to the outputs from the first and second comparison means; and
   a second logic operation means for performing a logic AND operation with the tag hit signal for the tag hit latch circuit and the valid bit from the fourth selection means.

8. The cache memory system in accordance with claim 7, wherein the first selection means selects and outputs an address of the first mapping region when the cache memory system functions as the main memory, or selects and outputs an address on the address bus when the cache memory system functions as the cache memory in response to the cache/memory signal, and wherein the second selection means selects and outputs an address of the second mapping region when the cache memory system functions as the main memory, or selects and outputs an address on the address bus when the cache memory system functions as the cache memory in response to the cache/memory signal.

9. The cache memory system in accordance with claim 7, wherein each of the first and second valid bit register is established to be valid when the cache memory system functions as the main memory in response to the cache/memory signal.

10. The cache memory system in accordance with claim 7, wherein the addresses of the first and second mapping region are programmable according to regions mapped into the main memory when the cache memory system functions as the main memory.

11. The cache memory system in accordance with claim 7, wherein the cache/memory signal is programmed by an arbitrary bit in a system control register which control hardware in a microprocessor having the cache memory system, wherein the arbitrary bit is not used for a system control.

12. The cache memory system in accordance with claim 11, wherein the cache memory system is used as the main memory when the cache/memory signal is in a high level and is used as the cache memory when the cache/memory signal is in a low level.

13. A cache memory system including a directly mapped structure comprising:
   a first selection means for selectively outputting one out of a tag field on a address bus when a data is loaded into the cache memory system from a main memory and an address value corresponding to a starting address point of a mapping region in which the cache memory system is mapped into the main memory in response to a cache/memory signal;
   a tag register for storing a tag value from the first selection means;
   a comparison means for comparing the tag value stored in the tag register with the tag field inputted from the address bus to read out data from the cache memory system;
   a tag hit latch circuit for storing an output signal from the comparison means as a tag hit signal;
   a plurality data registers for storing data which are loaded into the cache memory system from the main memory;
   a second selection means for selectively outputting the data stored in the plurality of data registers in response to an offset field on the address bus which is provided for reading out data from the cache memory system;
   a plurality of valid bit registers for storing valid bits indicative of a validity of data stored in the plurality of data registers;
   a third selection means for selectively outputting the valid bits of data stored in the plurality of valid bit registers in response to the offset field; and
   a logic operation means for performing a logic AND operation with the tag hit signal outputted from the tag hit latch circuit and the valid bits form the third selection means.

14. The cache memory system in accordance with claim 13, wherein the first selection means selects and outputs an address value corresponding to the starting address point of the mapping region when the cache memory system functions as the main memory, or selects and outputs the tag field on the address bus when the cache memory system functions as the cache memory in response to the cache/memory signal.

15. The cache memory system in accordance with claim 13, wherein each of the plurality of valid bit registers is established to be valid when the cache memory system functions as the main memory in response to the cache/memory signal.

16. The cache memory system in accordance with claim 13, wherein the starting address of the mapping address is programmable.

17. The cache memory system in accordance with claim 13, wherein the cache/memory signal is programmed by an arbitrary bit in a system control register which control hardware in a microprocessor having the cache memory system, wherein the arbitrary bit is not used for a system control.

18. The cache memory system in accordance with claim 17, wherein the cache memory system is used as the main memory when the cache/memory signal is in a high level and is used as the cache memory when the cache/memory signal is in a low level.

19. A method for controlling a cache memory system which uses an internal cache of a microprocessor as a main memory, the method comprising the steps of:
   ascertaining a logic value of an arbitrary cache/memory bit indicative of the internal cache execution of the microprocessor from a plurality of bits stored in a system control register which controls hardware associated with the microprocessor;
   ascertaining whether an address, which is inputted to read out a data, exists in a mapping region of an internal cache memory in a mapping region if the logic value indicates that the internal cache is used the main memory; and
   reading out the data from the main memory if there is not the address in the mapping region and reading out the data from the cache memory if there is the address in the mapping region.

20. The method in accordance with claim 19, wherein the method further comprises the steps of:
   ascertaining whether a cache hit signal is produced if the internal cache memory is used as a cache memory; and
   reading out the data from the cache memory if the cache hit signal is produced and reading out the data from the main memory if the cache hit signal is not produced.

* * * * *